(12) United States Patent
Kodama

(10) Patent No.: US 7,023,331 B2
(45) Date of Patent: Apr. 4, 2006

(54) PERIPHERAL MONITOR FOR MONITORING PERIPHERY OF VEHICLE

(75) Inventor: Katsuhisa Kodama, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 537 days.

(21) Appl. No.: 10/397,941

(22) Filed: Mar. 27, 2003

(65) Prior Publication Data

US 2004/0075603 A1 Apr. 22, 2004

(30) Foreign Application Priority Data

Oct. 2, 2002 (JP) ............................ P2002-289758

(51) Int. Cl.
*B60Q 1/00* (2006.01)
(52) U.S. Cl. .................... 340/435; 340/511; 342/70; 342/81; 342/85; 342/94; 342/118; 702/94; 702/106
(58) Field of Classification Search .................... None
See application file for complete search history.

(56) References Cited

U.S. PATENT DOCUMENTS

| | | | | |
|---|---|---|---|---|
| 2,581,349 A | * | 1/1952 | Barret | 324/335 |
| 3,359,509 A | * | 12/1967 | Hall | 372/44.01 |
| 4,310,903 A | * | 1/1982 | Kay | 367/102 |
| 4,689,489 A | * | 8/1987 | Cole | 250/559.38 |
| 5,432,516 A | * | 7/1995 | Cherry et al. | 342/28 |
| 5,511,041 A | * | 4/1996 | Michalski | 367/99 |
| 5,689,250 A | * | 11/1997 | Kremser | 340/904 |
| 5,747,789 A | * | 5/1998 | Godik | 250/208.1 |
| 6,168,198 B1 | * | 1/2001 | Breed et al. | 280/735 |
| 6,229,455 B1 | * | 5/2001 | Yost et al. | 340/943 |
| 6,469,625 B1 | * | 10/2002 | Tomooka | 340/556 |
| 6,529,129 B1 | * | 3/2003 | Tomooka | 340/556 |

FOREIGN PATENT DOCUMENTS

JP 2002-71788 3/2002

* cited by examiner

*Primary Examiner*—Benjamin C. Lee
(74) *Attorney, Agent, or Firm*—Sughrue Mion, PLLC

(57) ABSTRACT

The invention solves a problem of fluctuation in performance in the conventional peripheral monitor for monitoring periphery of a vehicle that measures a distance to other vehicle or any other object by transmitting radio waves and informs a driver of the distance due to variation in environmental conditions such as water drop sticking onto the cover. A peripheral monitor 1 including a transmission antenna 2 for radiating transmission waves through the cover, a receiving antenna 3 for receiving reflected waves through the cover, and a data processor for measuring a distance to any object are disposed together in a cover 7. A transmission frequency at which reflected wave quantity is minimized is detected by detecting a first reflected signal level from the cover 7, and this frequency is a command to a variable frequency oscillator to conduct a transmission at this frequency at all times.

6 Claims, 16 Drawing Sheets

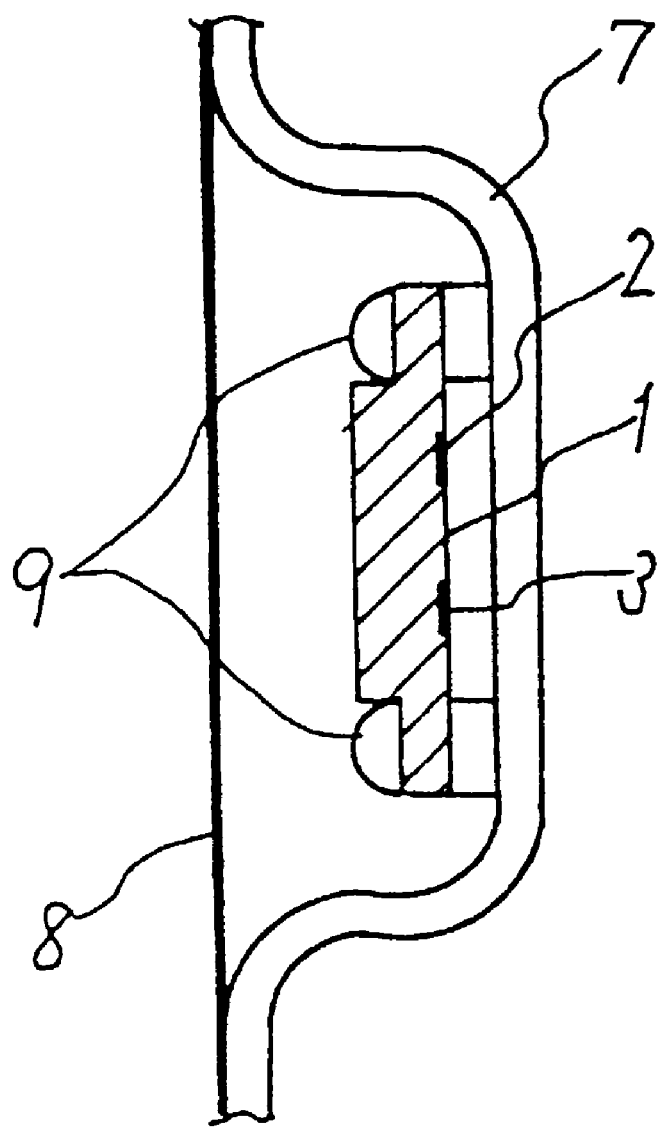
F I G . 2

PERIPHERAL MONITOR FOR MONITORING PERIPHERY OF VEHICLE

BACKGROUND OF THE INVENTION

1. Field of the Invention

The present invention relates to a peripheral monitor for monitoring periphery of a vehicle that is used to prevent the vehicle running on a road from running into and colliding with any obstacle by measuring a distance to the obstacle existing in the periphery of the vehicle and warning the driver.

2. Description of Related Art

Hitherto, a peripheral monitor for monitoring periphery of a vehicle is mounted on the inside of a bumper cover of the vehicle. For mounting such a peripheral monitor, relative position and angle between an antenna and the bumper are gradually changed while being monitored on the basis of amplification degree of an amplifier for amplifying strength of signals received by the antenna, and the antenna is fixed at a position and angle where amount of signal reflected from the bumper cover is the smallest in quantity. (See the Japanese Patent Publication (unexamined) No. 2002-071788 (paragraph 0030 to 0038, FIG. 2) 1, for example).

However, the inventors found out through experiments that the quantity of transmitted waves having been emitted or radiated from the transmitting antenna, reflected from the bumper and received by the receiving antenna fluctuates depending upon the quantity of foreign substance such as water drop, water film or dirt sticking onto the surface of the bumper.

SUMMARY OF THE INVENTION

In the peripheral monitor for monitoring periphery of a vehicle by transmitting radio waves and receiving reflected waves, it is necessary to reduce the quantity of radio waves radiated from the transmitting antenna and received directly by the receiving antenna.

However, in case of mounting antennas on the inside of a surface cover of the vehicle, relative positional and angular relationship between the transmitting/receiving antennas and the cover varies depending upon the configuration of the cover.

In the conventional peripheral monitor, it has been required to mount the antenna on each individual antenna at a position and at an angle so that the least quantity of radio waves are reflected from the cover, and therefore the antenna needs to be adjusted separately spending much time.

Further, when sticking any foreign matter such as water drop, water film or mud onto the cover surface, quantity of the reflected waves varies, and there arise a possibility of fluctuation in characteristics.

An object of the present invention is to provide a peripheral monitor, which is extremely easy to mount because of an extremely large allowance in position and in angle at the time of mounting an antenna.

A peripheral monitor according to the invention includes a variable frequency oscillator, a transmitting/receiving antenna, a receiving level analyzer, and a data processor.

As a result, since the transmission frequency is caused to follow the frequency at which level of the reflected signals reflected from the cover and received by the antenna is minimized, allowance in positioning the peripheral monitor at the time of initial mounting becomes extremely large.

The foregoing and other object, feature, aspect and advantage of the present invention will become more apparent the following detailed description of the present invention when taken in conjunction with the accompanying drawings.

BRIEF DESCRIPTION OF THE DRAWINGS

FIG. 2 is a schematic view showing a state of the peripheral monitor in FIG. 1 that is mounted on the vehicle.

DETAILED DESCRIPTION OF THE INVENTION

Embodiment 1

Figure 1:
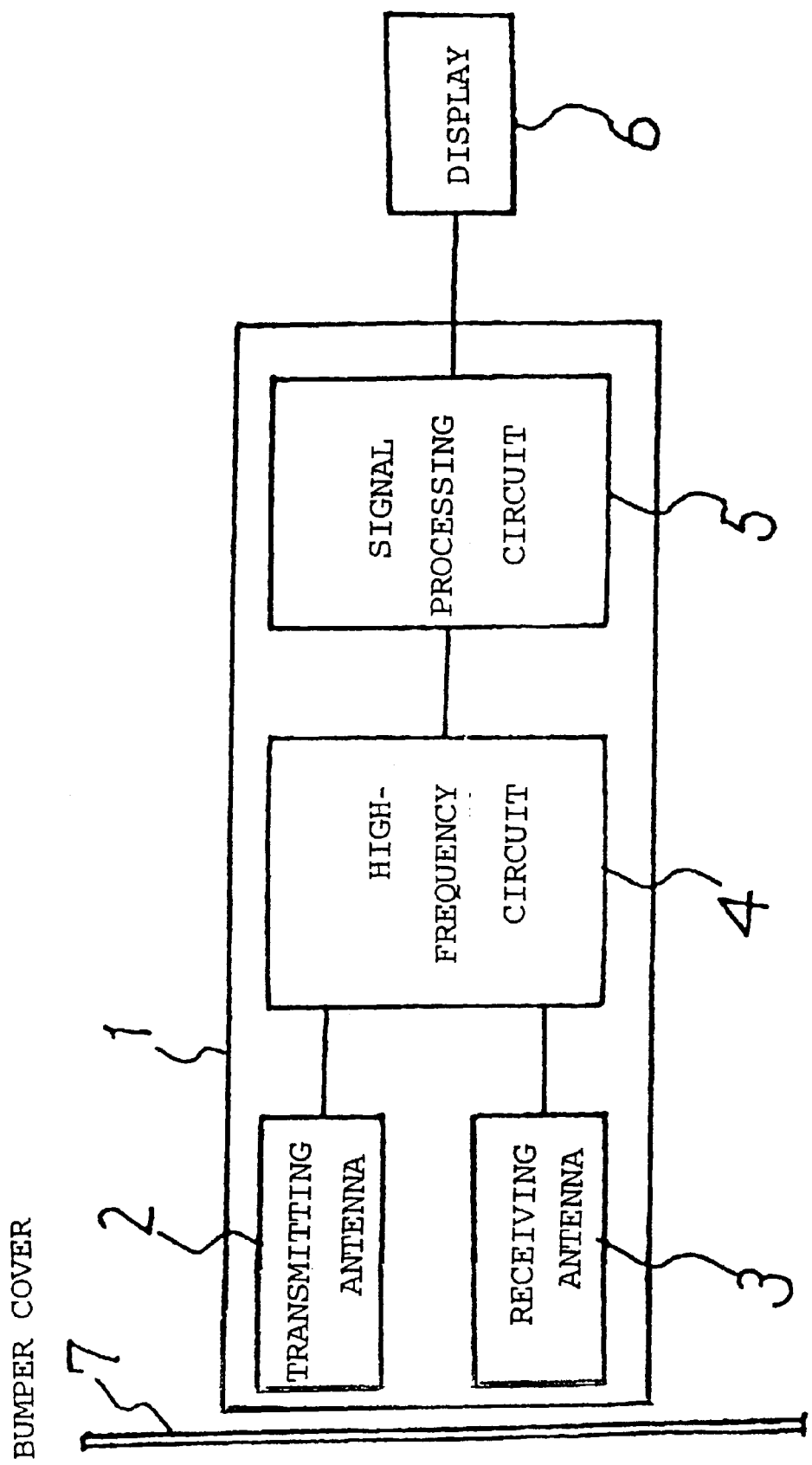
FIG. 1 is a schematic block diagram of a peripheral monitor for monitoring periphery of a vehicle according to Embodiment 1 of the invention.

FIG. 1 is a diagram showing a constitution of a peripheral monitor for monitoring periphery of a vehicle according to Embodiment 1 of the present invention. Referring to FIG. 1, a peripheral monitor 1 for monitoring periphery of a vehicle includes a transmitting antenna 2 for transmitting radio waves transmitting through a cover described below (more specifically a bumper or a bumper cover 7, hereinafter collectively referred to as cover), a receiving antenna 3 for receiving radio waves reflected from any object existing in the periphery of the vehicle via the bumper cover, a high-frequency circuit 4 provided with a transmitting circuit for transmitting radio waves and a receiving circuit for receiving radio waves, and a signal processing circuit 5 for processing data of received signals and commanding a transmission frequency. In this peripheral monitor, any result obtained by signal processing is displayed on a display 6 or the like, whereby information is provided to a driver.

The peripheral monitor 1 for monitoring periphery of a vehicle is mounted on the backside (inside) of the bumper cover 7 of the vehicle, and the mentioned display 6 is disposed inside of the vehicle. FIG. 2 is a schematic view showing a state of the peripheral monitor 1 for monitoring periphery of a vehicle mounted on the inside of the bumper cover. The peripheral monitor is put on the backside of the bumper cover 7 located at the front of the vehicle body 8, i.e., between the bumper cover 7 and the vehicle body 8, and is fixed onto the bumper cover 7 with bolts 9. The bumper cover 7 covering the peripheral monitor 1 for monitoring periphery of a vehicle including the transmitting antenna 2 and the receiving antenna 3 are made of a plastic material of a high radio transmittance. Thickness of the bumper cover 7 is designed to be sufficient for suppressing generation of reflected waves as much as possible.

Now, operation of the peripheral monitor 1 is described with reference to FIG. 1.

High-frequency signals generated by the high-frequency circuit 4 are emitted as radio waves from the transmitting antenna 2, and a part of them is reflected from the bumper cover 7 and received by the receiving antenna 3 (hereinafter referred to as "first reflected signal"). The rest of the high-frequency signals transmits through the bumper cover 7 and is radiated toward the periphery of the vehicle. Reflected waves (hereinafter referred to as "second reflected signal") from any obstacle (for example, from other vehicle) existing in the periphery of the vehicle transmit through the bumper cover 7 again and is inputted to the high-frequency circuit 4 by the receiving antenna 3. The received waves inputted to the high-frequency circuit 4 are detected or down-converted to a low frequency, and are inputted to the signal processing circuit 5. In the signal processing circuit 5, a distance to any object such as obstacle is computed on the basis of the time from emission to reception of the radio waves. If it is judged that the vehicle is in danger of colliding with the object, the display 6 gives warning to the driver.

Figure 3:
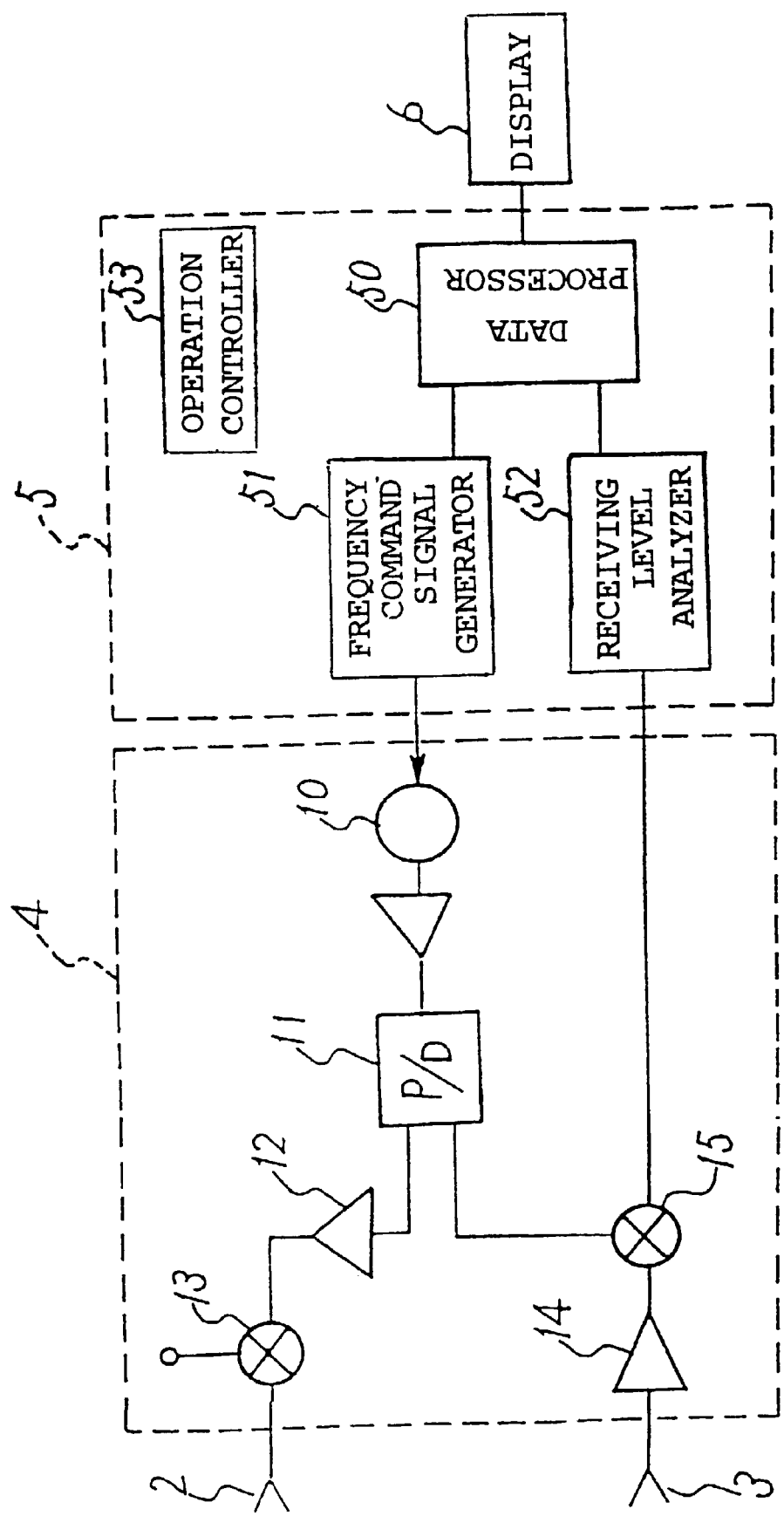
FIG. 3 is a detailed block diagram of FIG. 1.

Now, arrangement and operation of the high-frequency circuit 4 and the signal processing circuit 5 shown in FIG. 3 is hereinafter described in detail.

An operation controller 53 controls operation modes of the peripheral monitor 1 for monitoring periphery of a vehicle as a whole. The driver using a switch not shown may select any operation mode manually. It is also possible for an operation mode to be automatically switched to another when required on condition that later described requirements are satisfied. In this Embodiment 1, the operation is described supposing that operation mode is selected manually by switching.

The operation mode includes at least a monitoring mode for monitoring periphery and an adjusting mode for automatically examining optimum operating conditions.

In the monitoring mode, first a frequency command signal generator 51 gives a command to oscillate at a frequency of 12.05 GHz, for example. The command is delivered to a voltage control oscillator 10, and oscillating waves of 12.05 GHz oscillated by the voltage control oscillator 10 are distributed by a distributor 11 and amplified by a transmission amplifier 12. Thereafter, the oscillating waves are multiplied or mixed with a fixed frequency not shown by a transmission harmonic mixer 13, and then transmitted as transmitted waves of, for example, 24.1 GHz from the transmitting antenna 2. Reflected waves from the bumper cover 7 and those from the object are down-converted from the receiving antenna 3 via a reception amplifier 14 by a reception mixer 15, and inputted to the signal processing circuit. A receiving level analyzer 52 analyzes an output voltage of the reception mixer 15, whereby it becomes possible to detect quantity of the reflected waves from the object or the bumper cover as well as variation in quantity of the reflected waves.

Further, the transmission frequency can be changed by a frequency command signal (control voltage) given to the voltage control oscillator 10. Supposing that the frequency command signal generator 51 gives a command to oscillate at a frequency forming a saw-tooth waveform, the oscillating frequency can sweep a specific frequency range.

Figure 4:
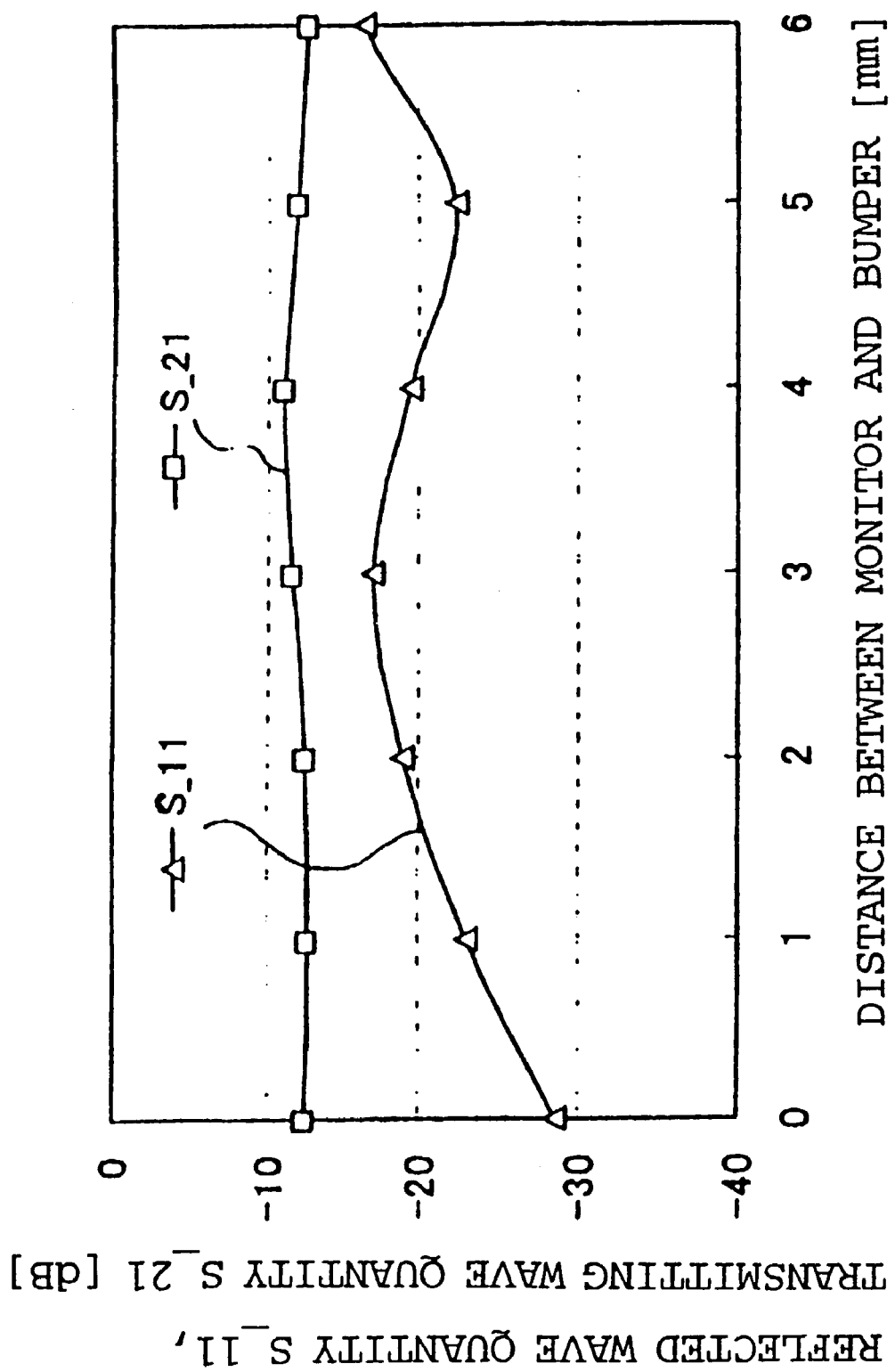
FIG. 4 is a graphic diagram showing quantity of radio waves reflected from the cover and quantity of radio waves transmitted through the cover in case of a constant transmission frequency.

FIG. 4 shows variation in quantity S11 of the radio waves reflected from the bumper cover as well as variation in quantity S21 of the radio waves transmitting through the bumper cover with respect to variation in distance between the transmitting antenna and the cover, in a case that the transmission frequency is constant. (Because the transmitting antenna 2, receiving antenna 3 and the peripheral monitor 1 for monitoring periphery of a vehicle are integrally formed in one body, the distance may be also hereinafter referred to as a distance between the peripheral monitor and the cover.) In addition, quantity of the transmitted waves is indicated by electric intensity of the radio waves transmitted through the cover 7 to outside. In the drawing, the axis of abscissas indicates a distance between the bumper cover and the peripheral monitor. The axis of ordinates indicates quantity of the radio waves reflected from the bumper cover and quantity of the radio waves transmitting through the bumper cover both with respect to quantity of the transmitted waves. It is understood from this drawing that the distance between the peripheral monitor and the bumper has a fluctuation allowance of no more than 1 mm if the variation in quantity of the reflected waves is restrained up to 3 dB.

Figure 5:
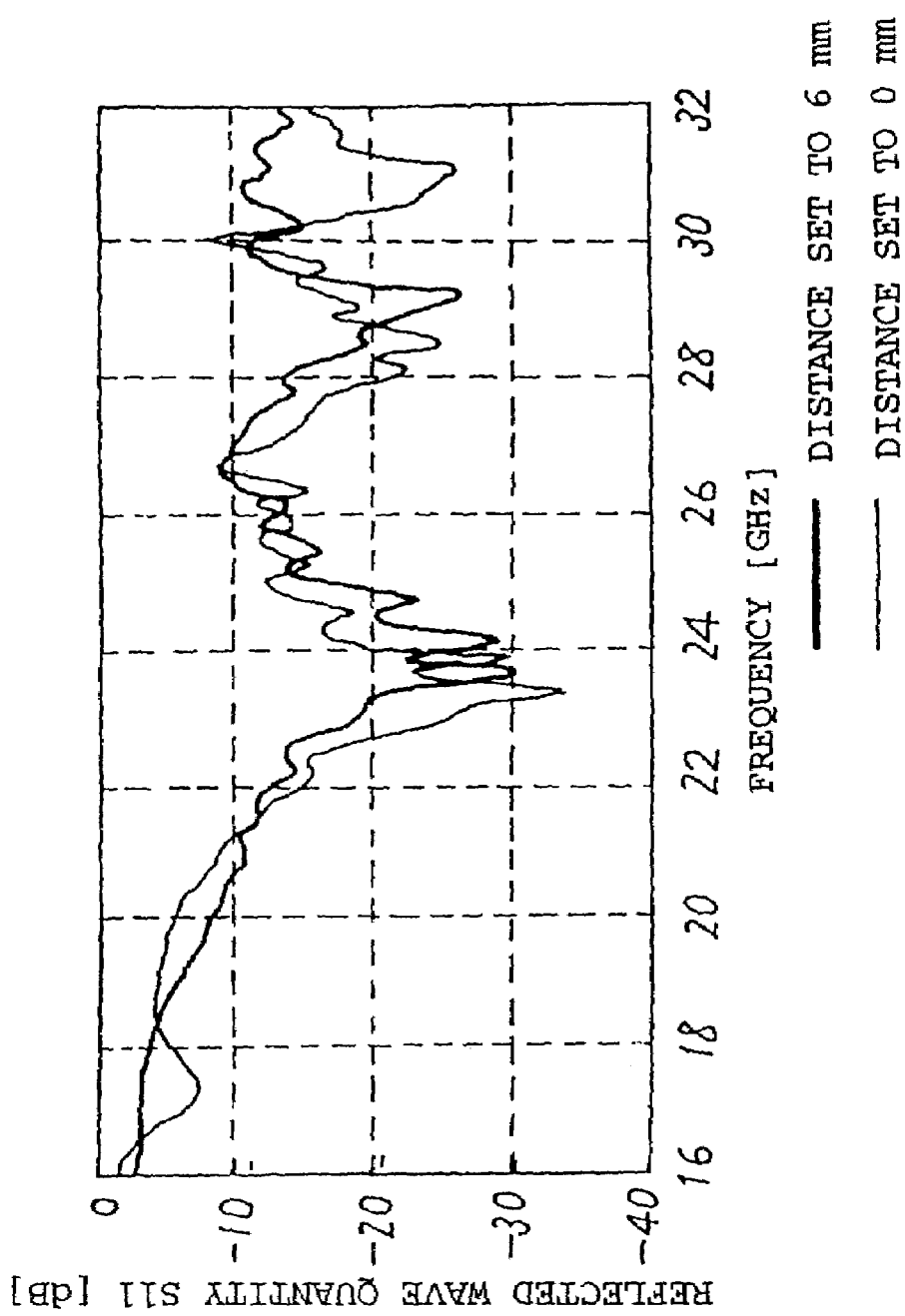
FIG. 5 is a graphic diagram showing frequency characteristics in quantity of the reflected waves in a case that a space between the cover and the peripheral monitor is 0 mm and in a case that a space between the cover and the peripheral monitor is 6 mm.
Figure 6:
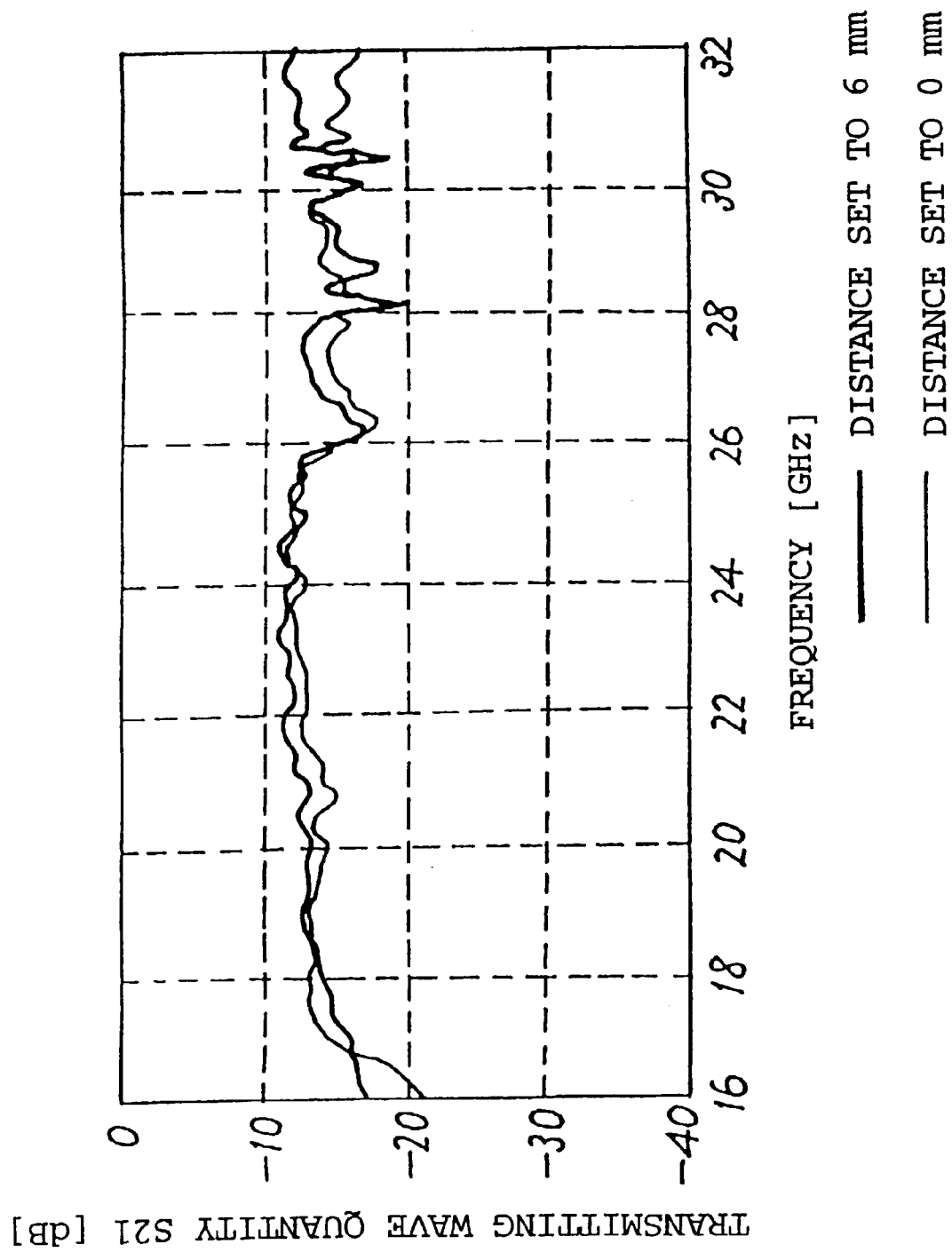
FIG. 6 is a graphic diagram showing frequency characteristics in quantity of the transmitted waves in a case that a space between the cover and the peripheral monitor 0 mm and in a case that a space between the cover and the peripheral monitor is 6 mm.

FIG. 5 shows characteristics of variation in quantity of the reflected waves with respect to variation in frequency in a case that a distance between the bumper cover and the peripheral monitor is 0 mm as well as in a case that a distance between the bumper cover and the peripheral monitor is 6 mm. FIG. 6 shows characteristics of variation in quantity of the transmitted waves in the same cases. It is understood from FIGS. 5 and 6 that it is possible to acknowledge a frequency at which quantity of the reflected waves is minimized (not more than −30 dB) by changing the transmission frequency in both distances between the bumper cover and the peripheral monitor. Although not shown in the drawings, the inventors of the present application have verified that it is true in any case that the distance is within the range of 0 to 6 mm.

When the operation controller 53 gives a command to switch to the adjusting mode, the frequency command signal generator 51 changes the output signal to a saw-tooth waveform and inputs the signal to the voltage control oscillator 10. Thus, the transmission frequency outputted from the transmitting antenna 2 is swept within a predetermined range. The receiving level analyzer 52 monitors variation in level of the signals reflected from the cover with respect to the variation in frequency. In this manner, it is possible to acknowledge a frequency at which quantity of the reflected waves is minimized, i.e., optimum frequency under the present state of mounting the peripheral monitor. The optimum frequency obtained by the receiving signal analyzer 52 is stored and delivered to the frequency command signal generator 51. At this time, the reflection level is also stored. The foregoing operation completes just in several hundreds microseconds. Thus, when ending the predetermined adjusting mode through the foregoing operation, the operation controller 53 automatically outputs a command to switch over to the monitoring mode.

When the operation controller 53 outputs a command to switch to the monitoring mode, the frequency command signal generator 51 outputs the optimum frequency stored and delivered during the adjusting mode. Such output sets to a frequency at which quantity of the reflected waves is minimized regardless of the position and angle adjusted at the time of initial setting. In other words, it is not necessary to precisely adjust the position and angle set at the time of initial setting. Furthermore, when required, the driver selects the adjusting mode and monitors quantity of the reflected waves from the bumper cover to correct the transmission frequency again. As a result of this, it is possible to prevent increase in quantity of the reflected waves due to getting out of the position after the initial setting. When starting a gain the peripheral monitor after stopping it, the operation is started at the latest frequency stored. The foregoing operation provides an advantage that the driver can start driving the vehicle without anxiety because the driver can reset the frequency of the peripheral monitor for monitoring periphery of a vehicle at any time by manipulating the operation controller.

It is not always necessary to have the range within which the frequency is varied as wide as shown in FIG. 5. The advantage of sufficiently covering an error in practical mounting and facilitating the mounting of the peripheral monitor will be provided even in the case of covering, for example, approximately ±10% of the initial frequency.

The peripheral monitor for monitoring periphery of a vehicle is mounted on the inside of the bumper cover 7 in the foregoing description. Furthermore, it is a matter of course that the peripheral monitor can be mounted on a part of the vehicle body serving as a cover, on condition that the cover is made of a radio wave transmittable material. The bumper cover 7 and the part of the body are collectively referred to as "cover" in the invention. The signal processing circuit 5 includes a microcomputer not shown, and performs a predetermined operation according to a program given to the microcomputer.

Embodiment 2

In the description of the foregoing Embodiment 1, every measurement (transmission and reception of pulses and analysis of the data) in the monitoring mode takes several tens microseconds (for example, 50 microseconds).

Repeating the measurement continuously carries out monitoring apparently, and the reflection level is measured for every transmission. For example, a reflection from an object to be monitored such as other vehicle is discriminated from that from the bumper cover on the basis of a difference in reflection time. In this manner, level of the reflection from the bumper is measured in every measurement in this way. If it is judged that the reflection level is above a predetermined level, the operation controller 53 automatically gives a command to switch to the adjusting mode, and measurement is carried out for the optimum frequency as described in the foregoing Embodiment 1. Thereafter, the monitoring mode with the optimum frequency is automatically continued. The adjusting mode ends just within several hundreds microseconds as described above, and therefore even if the frequency is adjusted during the monitoring mode, the adjustment completes before the driver is aware of it, and therefore the adjustment does not interfere with the driving.

Embodiment 3

Figure 7:
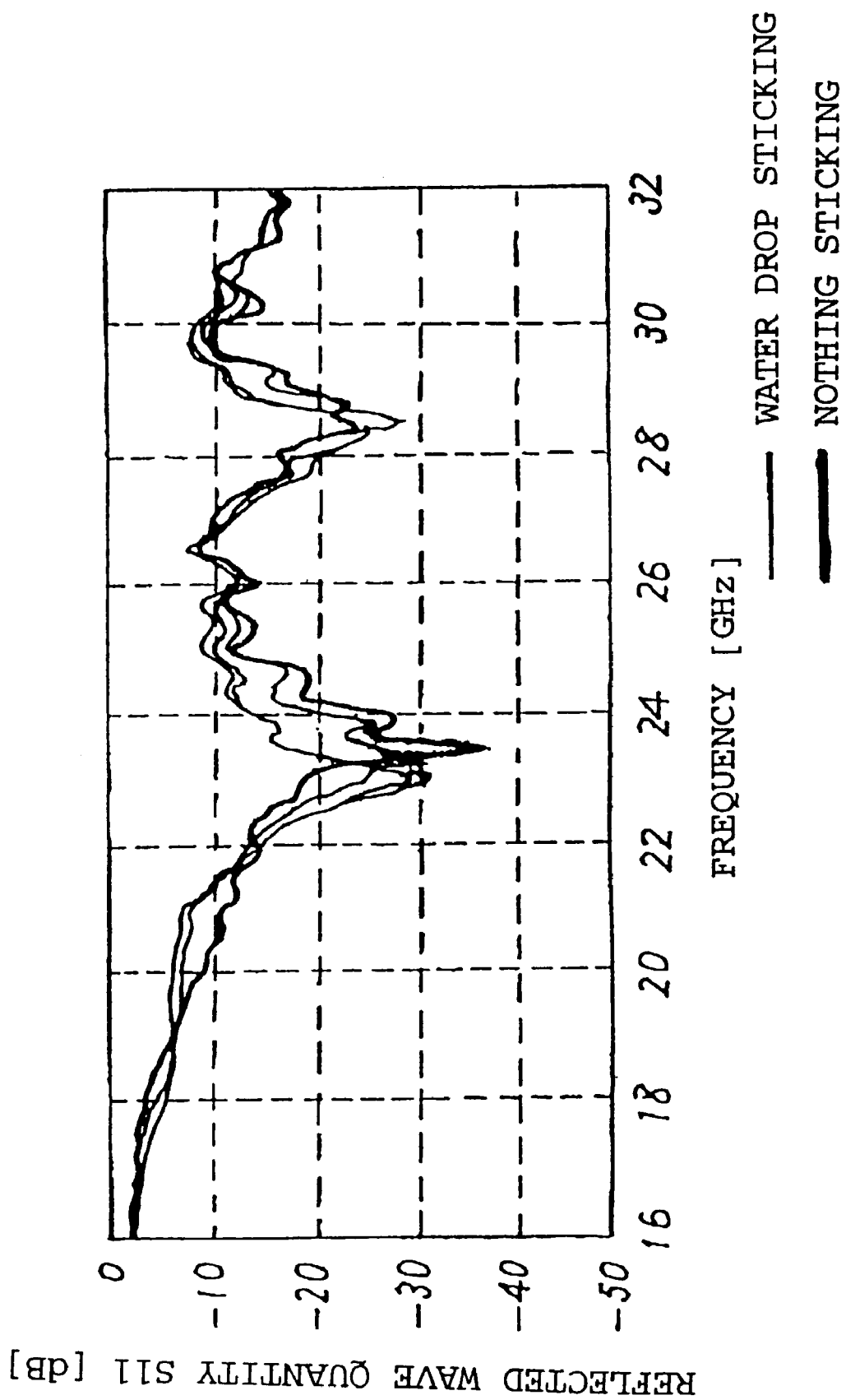
FIG. 7 is a graphic diagram for explaining variation in quantity of the reflected waves in a case that there is any water drop sticking onto the cover.
Figure 8:
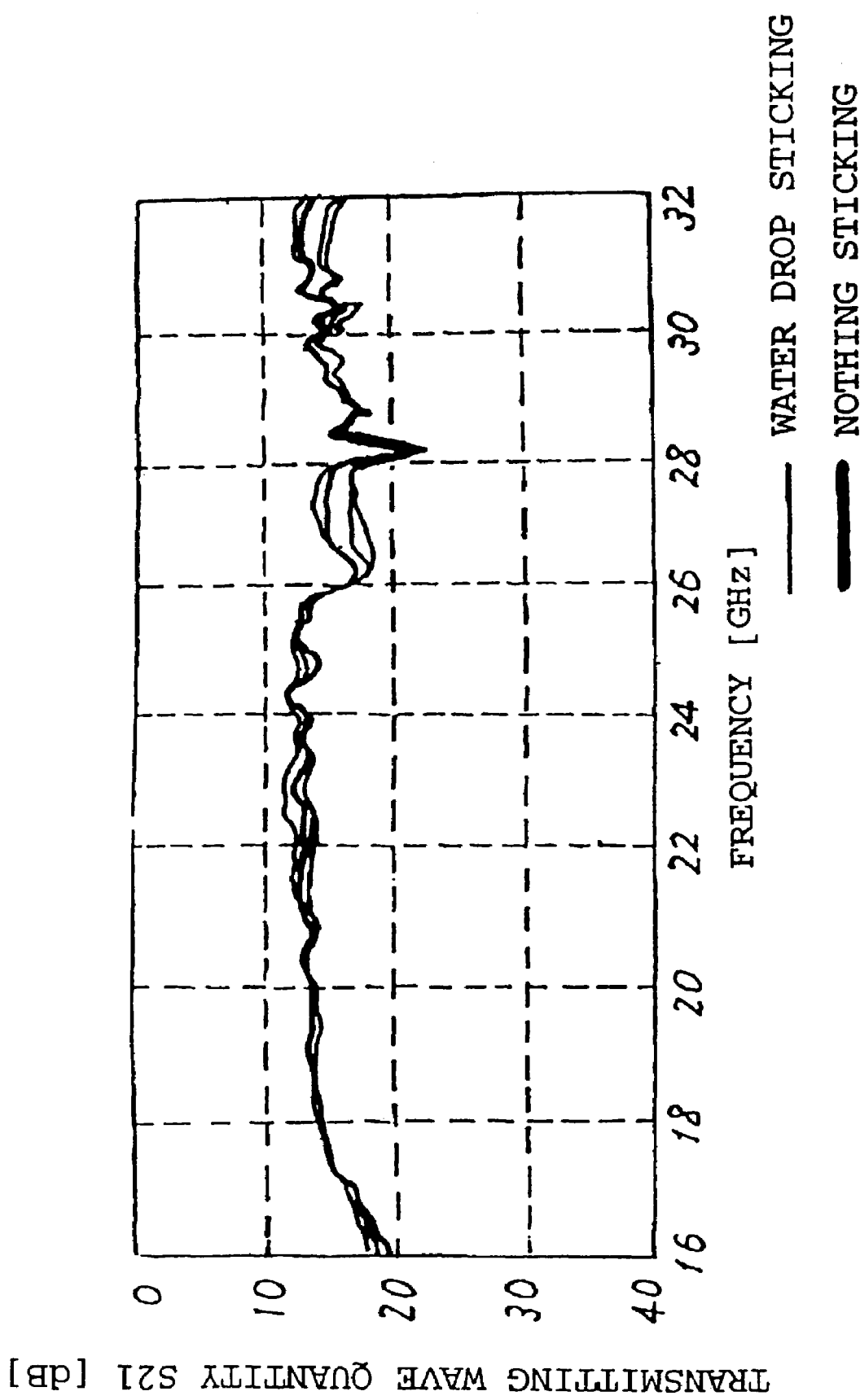
FIG. 8 is a graphic diagram for explaining variation in quantity of the transmitted waves in a case that there is any water drop sticking onto the cover.
Figure 9:
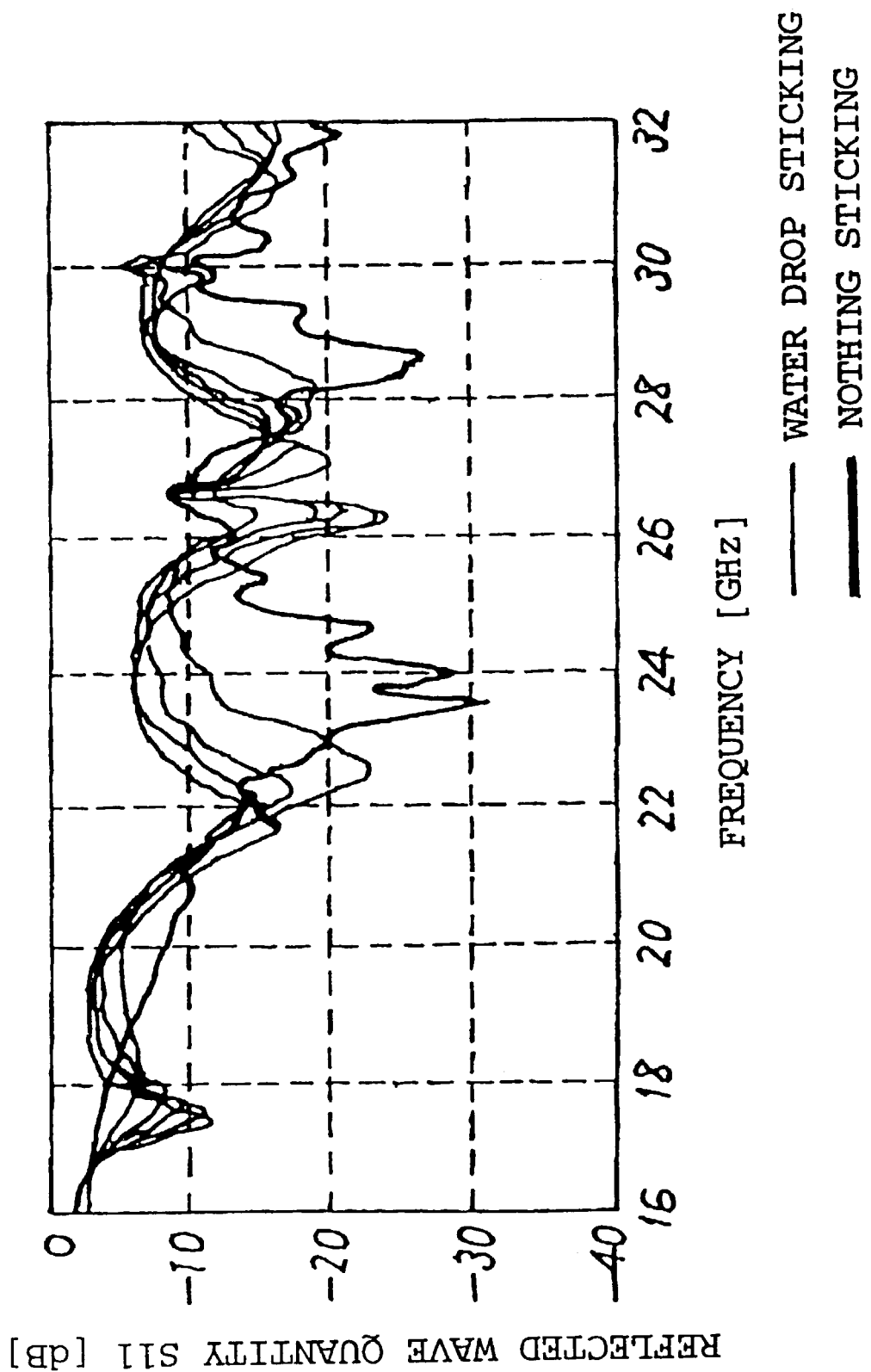
FIG. 9 is a graphic diagram for explaining variation in quantity of the reflected waves in a case that there is any water film sticking onto the cover.
Figure 10:
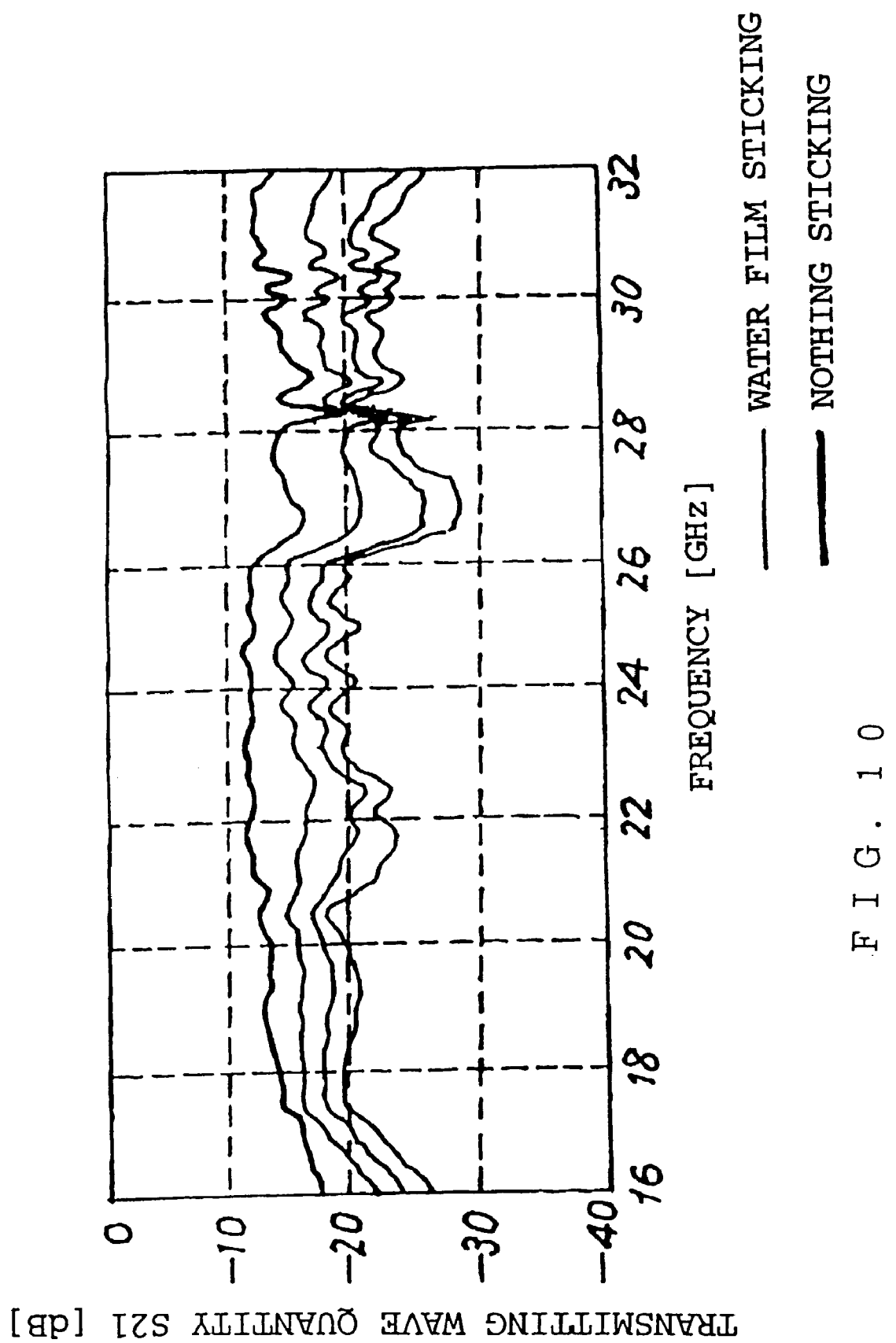
FIG. 10 is a graphic diagram for explaining variation in quantity of the transmitted waves in a case that there is any water film sticking onto the cover.
Figure 11:
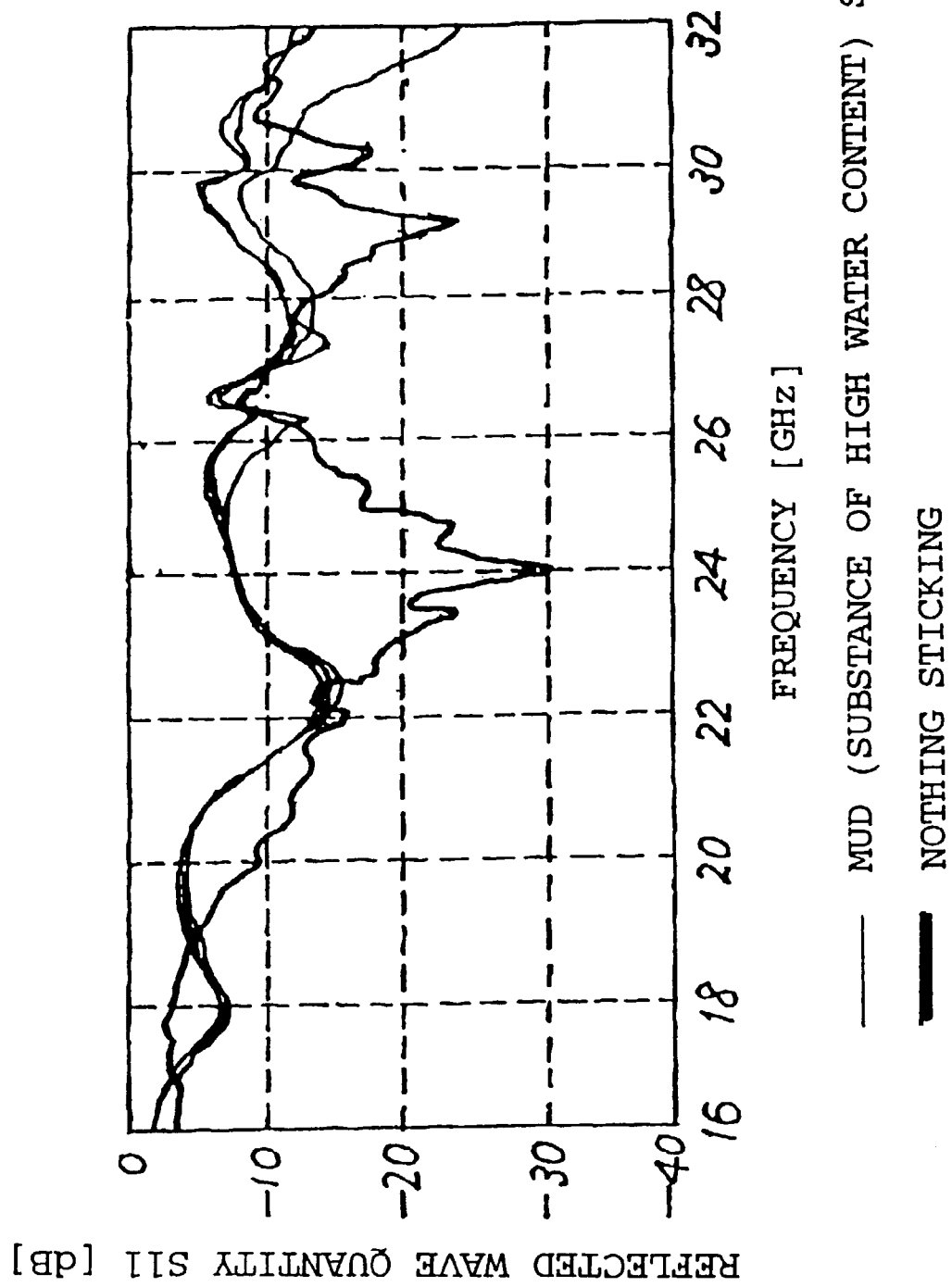
FIG. 11 is a graphic diagram for explaining variation in quantity of the reflected waves in a case that there is any mud containing a high percentage of water sticking onto the cover.
Figure 12:
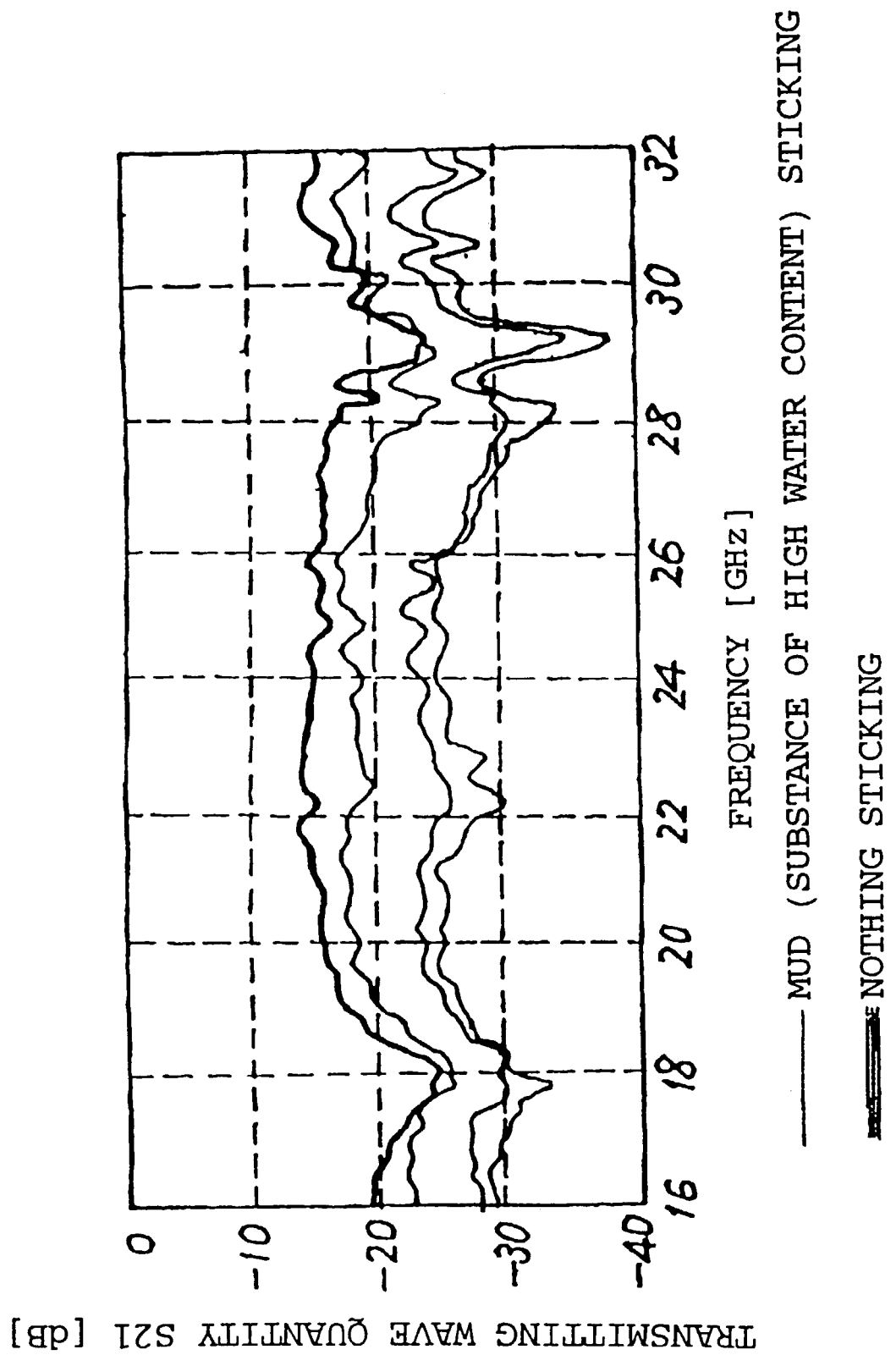
FIG. 12 is a graphic diagram for explaining a change in quantity of the transmitted waves in a case that there is any mud containing a high percentage of water on the cover.
Figure 13:
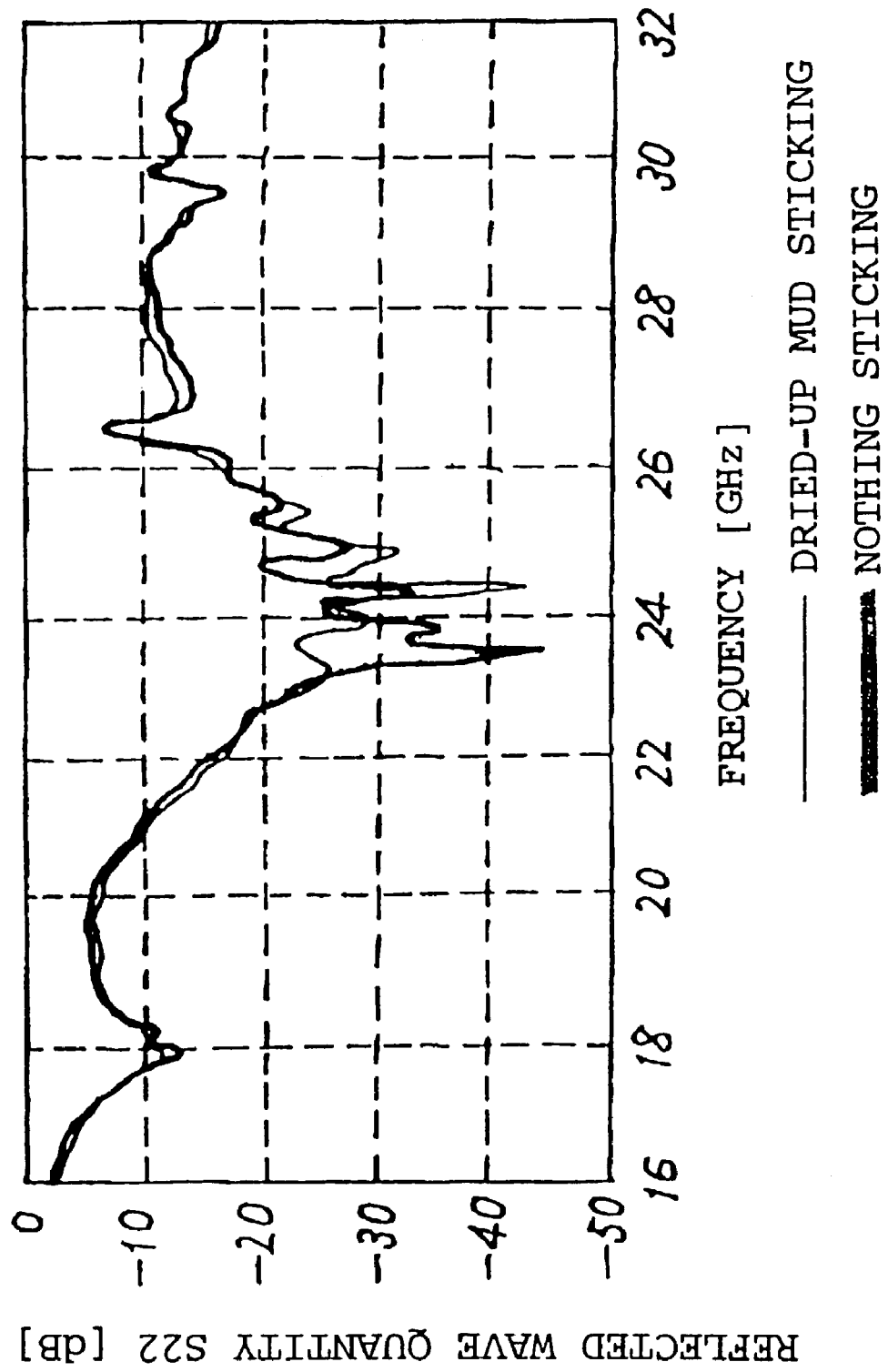
FIG. 13 is a graphic diagram for explaining variation in quantity of the reflected waves in a case that there is any dried-up mud sticking onto the cover.
Figure 14:
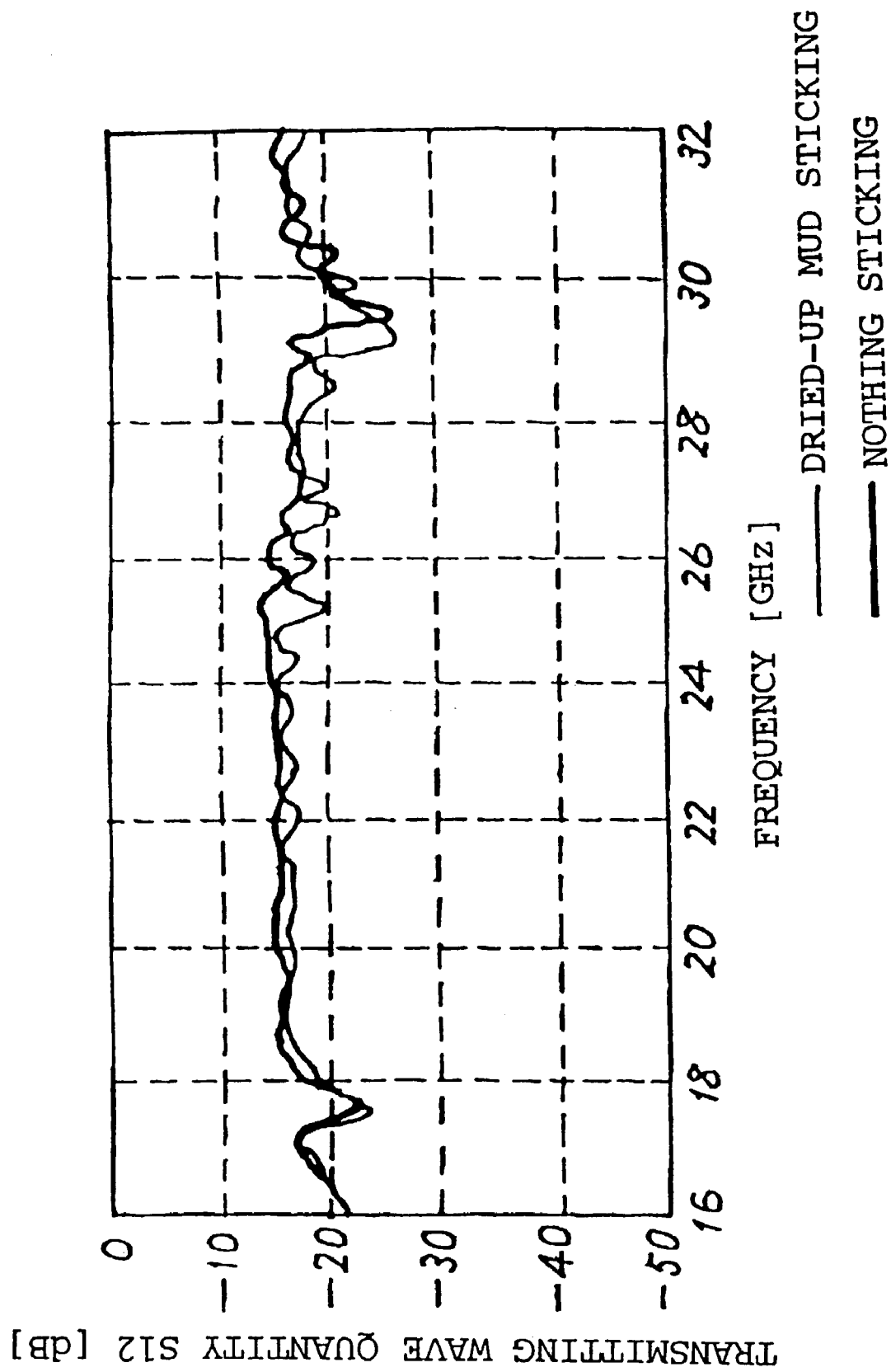
FIG. 14 is a graphic diagram for explaining variation in quantity of the transmitted waves in a case that there is any dried-up mud sticking onto the cover.

It is sometimes the case that during driving the vehicle, water drop, water film or dirt sticking onto the surface of the bumper cover 7 due to rain, snow, or splashes of mud. Under such a situation, there is a likelihood of variation in reflection from the bumper cover. Described hereunder is the case where there is nothing sticking onto the bumper cover and the case where there is any foreign matter such as water drop, water film or dirt sticking onto the surface of the bumper cover. Regarding these two cases, variation in quantity of radio waves reflected from the bumper cover and that in quantity of radio waves transmitting through the bumper cover with respect to variation in transmission frequency are going to be described with reference to FIGS. 7 to 16. FIGS. 7 and 8 show variation in quantity of radio waves reflected from the bumper cover and that in quantity of radio waves transmitting through the bumper cover in the case that any water drop sticks onto the bumper cover. FIGS. 9 and 10 show variation in quantity of reflected waves and that in quantity of transmitted waves in the case that any water film sticks onto the bumper cover. FIGS. 11 and 12 show variation in quantity of reflected waves and that in quantity of transmitted waves in the case that any mud sticks onto the bumper cover. FIGS. 13 and 14 show variation in quantity of reflected waves and that in quantity of transmitted waves in the case that any dried-up mud sticks onto the bumper cover (the same applies to a case where any mud splashed on the bumper cover has dried afterward). Plural lines are used to indicate the characteristics in each drawing because the data varies due to variation in degree of, for example, water drops sticking onto the bumper cover. The data indicating the case of nothing sticking onto the bumper cover shown in FIGS. 7, 9, 11 and 13 are substantially to show the same characteristics as the data of nothing sticking onto the bumper cover shown in FIGS. 8, 10, 12 and 14. However, actually they are different in the drawings. This is because the bumper cover or the peripheral monitor for monitoring periphery of a vehicle used in measuring respective characteristics is not the same one used in measuring other characteristics.

Figure 15:
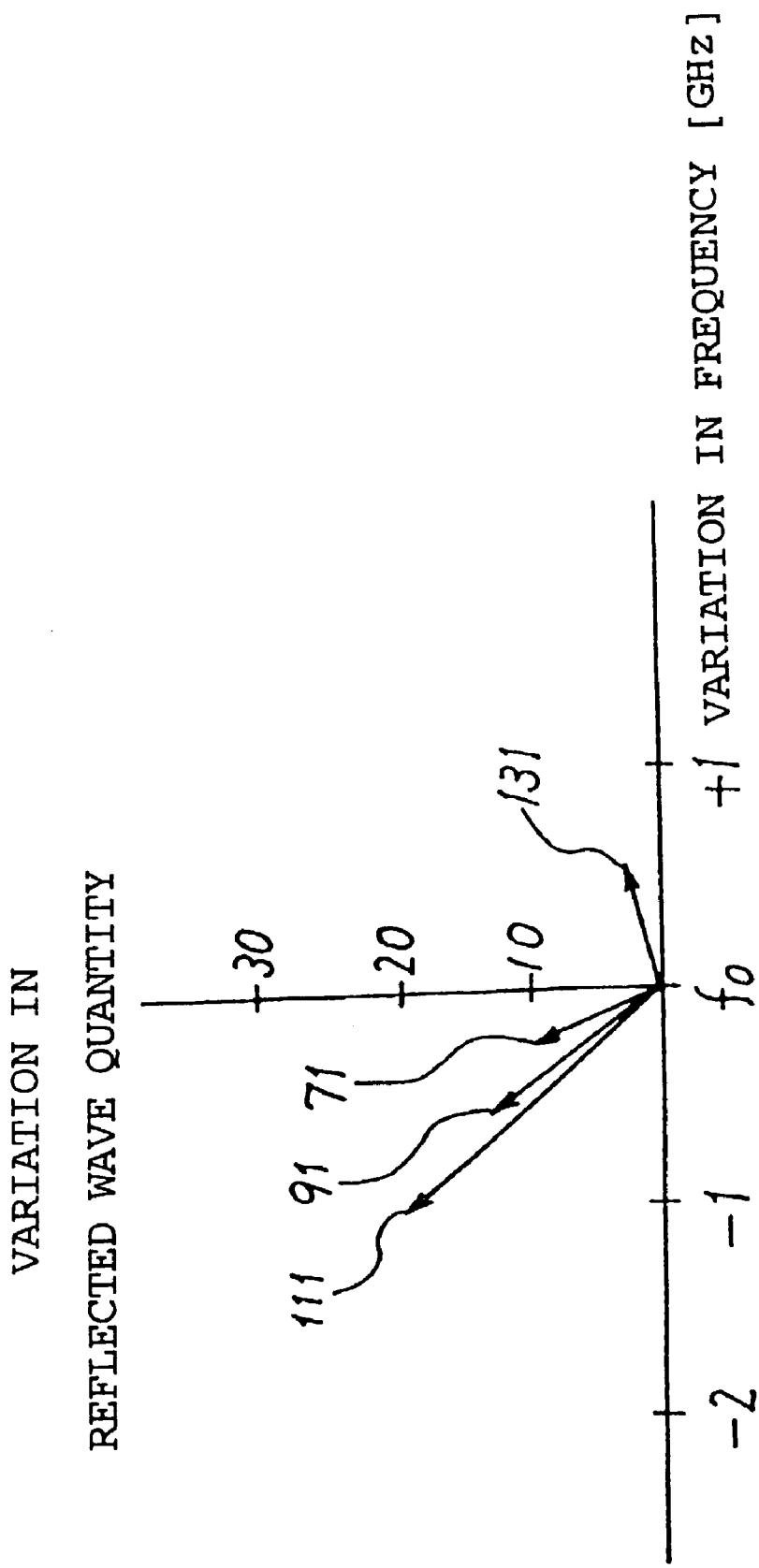
FIG. 15 is a graphic diagram for explaining characteristics to show collectively characteristics of FIGS. 7, 9, 11, and 13.
Figure 16:
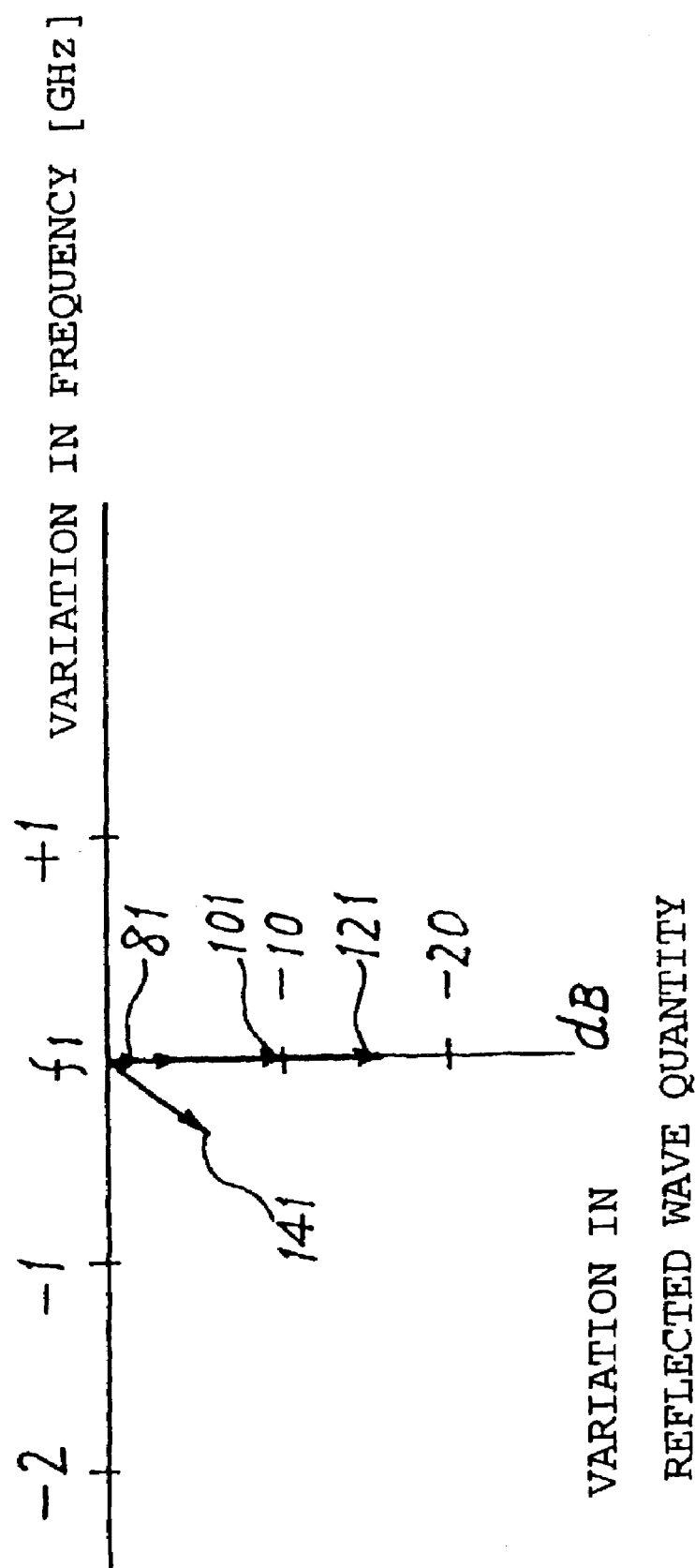
FIG. 16 is a graphic diagram for explaining characteristics to show collectively characteristics of FIGS. 8, 10, 12, and 14.

In order to facilitate understanding of the variation in characteristics, variations in frequency at which the reflection level is minimized, reflection level or transmission level thereof shown in FIGS. 7 to 14 are shown together in one drawing. FIGS. 15 and 16 show them respectively. Specifically, FIG. 15 is a graphic diagram showing together the variations in reflection level. In this drawing, reference numeral f0 indicates a frequency at which the reflection level is minimized in the case of nothing sticking onto the bumper cover in FIGS. 7, 9, 11, and 13. Reference numeral 0 dB indicates a reflection level in the case of nothing sticking onto the bumper cover at the frequency f0.

FIG. 16 is another graphic diagram showing together the variations in reflection level. In this drawing, reference numeral f1 indicates a frequency at which the reflection level is minimized in the case of nothing sticking onto the bumper cover shown in FIGS. 8, 10, 12, and 14. Reference numeral 0 dB indicates a transmission level in the case of nothing sticking onto the bumper cover at the frequency f1.

Numeral 71 indicates the variation in reflection level characteristics of FIG. 7, numeral 91 indicates the variation in characteristics of FIG. 9, numeral 111 indicates the variation in characteristics of FIG. 11, and numeral 131 indicates the variation in characteristics of FIG. 13.

Numeral 81 indicates the variation in transmission level characteristics of FIG. 8, numeral 101 indicates the variation in characteristics of FIG. 10, numeral 121 indicates the variation in characteristics of FIG. 12, and numeral 141 indicates the variation in characteristics of FIG. 14.

Referring to FIGS. 7, 9, 11, and 13 as well as in FIG. 15 where those figures are collectively shown, the frequency where the reflection quantity is minimized tends to shift toward a lower frequency in the case of any foreign substance such as water drop, water film or mud (foreign substance of a high content of water) sticking onto the bumper cover, as compared with the case of nothing sticking onto the bumper cover. This is because the dielectric constant ($\in w=25$@24 Ghz: see Antenna Engineering Handbook P. 711) of the foreign substance such as water drop, water film, or mud (foreign substance of a high content of water) sticking onto the surface of the bumper cover is much higher than the dielectric constant ($\in=3$ to 5) of the plastic composing the bumper cover.

In general, thickness t of the bumper cover is designed to be a thickness in which quantity of reflected waves is minimized taking radio transmittance into consideration, for example, $$t=(n \cdot \lambda)/\sqrt{\in 0}$$

(where: n is an integer, λ is a free space wavelength of a transmitted wave, and $\in$ is a dielectric constant of the material)

The above expression is transformed into $$t=(n \cdot C)/\sqrt{\in} \cdot f$$

(where: C is a velocity of light, f is a transmission frequency, and $\in$ is a composite dielectric constant of the bumper cover and the foreign substance sticking onto the bumper cover).

When there is any foreign substance such as water drop, water film or dirt (foreign substance of a high content of water) sticking onto the bumper cover designed to have the foregoing specific thickness t, the composite dielectric constant $\in$ of the bumper cover and the sticking foreign substance increases, and consequently, the frequency f0 (coincident to a resonance frequency in the direction of thickness of the bumper cover) at which the reflection level is minimized, is lowered. If this variation in frequency in each case of water drop, water film or mud sticking onto the bumper cover is preliminarily measured, it is possible for a data processor 50 to specifically judge whether the foreign substance sticking onto the bumper cover is water drop, water film or mud (foreign substance of a high content of water) by measuring the lowered frequency. Referring to FIGS. 9 and 11, in the case where any water film f or mud (foreign substance of a high content of water) sticks onto the bumper cover, the point at which the reflection quantity is minimized shifts to a lower frequency side as compared with the case of nothing sticking onto the bumper cover, and moreover, the quantity reflection of (−20 dB) is higher than the reflection quantity of (−30 dB) in the case of water drop sticking onto the bumper cover.

In the case where the foreign substance sticking onto the bumper cover is a dried-up mud shown in FIGS. 13 and 14, the frequency at which the reflection quantity is minimized shifts toward a higher frequency side as compared with the frequency in the case of nothing sticking onto the bumper cover as indicated by numeral 131 in FIG. 15 and numeral 141 in FIG. 16, and there is little variation in attenuation.

Accordingly, it is possible to make a distinction between water drop and any foreign substance of a high content of water such as water film or mud by setting a threshold value of the quantity of radio waves reflected from the bumper cover to approximately −25 dB. It is also possible to make a distinction from dried-up mud when the reflection level remains unchanged and only the frequency shifts. This judging operation is carried out by judgment means (not shown) disposed in the data processor 50. The results of judgment are displayed on the display 6.

When there is any foreign substance such as water drop, water film, mud (foreign substance of a high content of water) or dried-up mud sticking onto the bumper cover, as well as in Embodiment 1, the transmission frequency may be brought to a frequency at which the quantity of radio waves reflected from the bumper cover is minimized, whereby it becomes possible to minimize deterioration in ranging performance due to increase in quantity of radio waves reflected from the bumper cover. It is certainly possible to minimize influence of the object sticking onto the bumper cover by adjusting the frequency, but deterioration in ranging performance becomes considerable due to increase in reflection level and decrease in transmission level in the course of variation from water drop to water film, and from water film to mud. However, it is possible to improve safety by driving the vehicle recognizing the deterioration in ranging performance from the kind of foreign substance sticking onto the bumper cover displayed on the display 6 and/or stopping the vehicle to remove the sticking mud from the bumper cover when dried-up mud sticks onto the bumper cover.

Although the display 6 displays the kind of foreign substance sticking onto the bumper cover in the foregoing description, it is also preferable that, for example, whether or not any foreign substance sticking onto the bumper cover is displayed on the display 6. If the driver recognizes at least the presence of any foreign substance sticking onto the bumper cover, the driver can stop the vehicle to remove the foreign substance. Thus the peripheral monitor provides an advantage of improving safety in driving.

What is claimed is:

1. A peripheral monitor for monitoring periphery of a vehicle comprising:

variable frequency oscillating means that oscillates high-frequency signals of a commanded frequency;

a transmitting antenna that is mounted inside of a cover disposed on a surface of the vehicle, and transmits high-frequency signals transmitting through the cover;

a receiving antenna that receives reflected waves of the transmitted waves from any object;

a receiving level analyzer that analyzes signal level of said reflected waves, discriminates between a first reflected signal of the transmitted waves reflected from the mentioned cover and a second reflected signal reflected from any object on the basis of the received reflected signals, and outputs data of receiving timing and a signal level of the first and second reflected signals respectively; and a data processor that processes the data and computes a distance to the object, and detects a frequency at which level of the first reflected signal is minimized and commands the mentioned variable frequency oscillator to oscillate at this frequency.

2. The peripheral monitor for monitoring periphery of a vehicle according to claim 1, further comprising an operation mode controller performing a function of switching an operation mode between a monitoring mode in which signals of a commanded frequency are transmitted and a distance to said object is measured and an adjusting mode in which said frequency is changed and a frequency that minimizes the signal level of said first reflected signals is specified.

3. The peripheral monitor for monitoring periphery of a vehicle according to claim 2, wherein said operation controller has a function of automatically switching the operation mode from said monitoring mode to said adjusting mode when signal level of said first reflected signals becomes higher than a predetermined level during operation of the peripheral monitor in said monitoring mode.

4. The peripheral monitor for monitoring periphery of a vehicle according to claim 1, further comprising:

judging means that stores a level of said first reflected signals at a commanded frequency and said frequency, and judges whether or not there is any foreign substance sticking onto said cover on the basis of variation in frequency at which the level of said first reflected signals is minimized and in said reflected signal level at said frequency from said stored signal level and said stored frequency when said transmission frequency is varied; and display means that displays results of said judgment for a driver.

5. The peripheral monitor for monitoring periphery of a vehicle according to claim 4, wherein said judging means judges kind of foreign substance sticking onto said cover on the basis of variation in frequency at which level of said first reflected signals is minimized and in signal level at said frequency from said stored signal level and said stored frequency.

6. The peripheral monitor for monitoring periphery of a vehicle according to claim 5, wherein said kind of foreign substance sticking onto the cover includes at least one of water drop, water film, dirt of any foreign substance of a high content of water, and dirt of any dried-up foreign substance.

* * * * *